United States Patent [19]

Denny et al.

[11] 4,094,778
[45] June 13, 1978

[54] SEQUESTERING OF Ca$^{++}$ AND Mg$^{++}$ IN AQUEOUS MEDIA USING ZEOLITE MIXTURES

[75] Inventors: Arthur Francis Denny, Katonah, N.Y.; Anthony Joseph Gioffre, Ridgefield, Conn.; John Delano Sherman, Chappaqua, N.Y.

[73] Assignee: Union Carbide Corporation, New York, N.Y.

[21] Appl. No.: 810,481

[22] Filed: Jun. 27, 1977

[51] Int. Cl.$^2$ ............................ C02B 1/44; C02B 5/02
[52] U.S. Cl. ..................................... 210/38 A; 210/57; 252/179
[58] Field of Search ............... 210/38 A, 57; 252/116, 252/179, 181, 455 Z

[56] References Cited

U.S. PATENT DOCUMENTS

| | | | |
|---|---|---|---|
| 1,683,967 | 9/1928 | Foster et al. | 210/38 A |
| 3,977,968 | 8/1976 | Odland | 210/38 A |
| 3,985,669 | 10/1976 | Krummel et al. | 252/179 |
| 4,040,972 | 8/1977 | Roebke et al. | 210/38 A |

FOREIGN PATENT DOCUMENTS

1,429,143  3/1976  United Kingdom.

Primary Examiner—Charles N. Hart
Assistant Examiner—Ivars Cintins
Attorney, Agent, or Firm—Richard G. Miller

[57] ABSTRACT

Mixtures of zeolite A and zeolite X containing about 40 to 70 weight per cent of each species are found to exhibit a synergistic effect in the sequestering by ion exchange of calcium and magnesium ions in hard water. These zeolite mixtures can be advantageously used in detergent compositions as substitutes in part or in full for polyphosphate builders.

3 Claims, 1 Drawing Figure

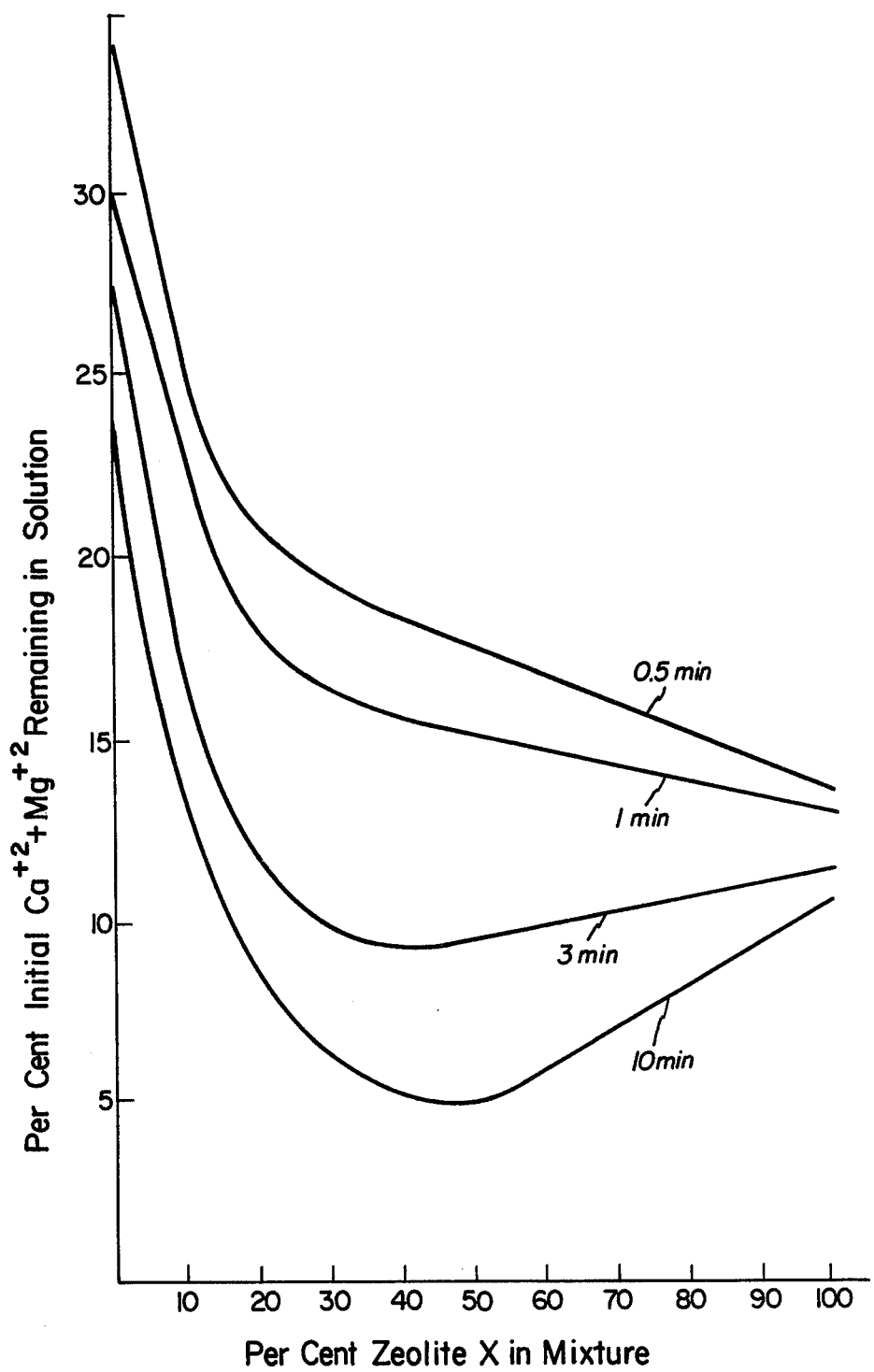

SEQUESTERING OF $Ca^{++}$ AND $Mg^{++}$ IN AQUEOUS MEDIA USING ZEOLITE MIXTURES

The present invention relates in general to the removal or sequestration of calcium and magnesium cations from aqueous solutions, and more particularly to the softening of hard water by ion exchange using mixtures of zeolite A and zeolite X. The compositions exhibit a higher degree of calcium and magnesium ion exchange from aqueous media than similar compositions containing equivalent amounts by weight of either zeolite alone.

In hard water, the addition of a soluble sodium soap causes the formation of insoluble calcium and magnesium soaps; also, insoluble salts of $SO_4^{-2}$ and $CO_3^{-2}$ are formed with alkaline earth cations. It has become common to measure the degree of hardness by a determination of the total calcium and magnesium ion concentration, usually expressed as equivalent calcium carbonate concentration.

Sequestration and ion-exchange are among the principal methods for softening, i.e. removing the calcium and magnesium from water supplies. The usual sequestering agents for calcium and magnesium are the polyphosphates and certain carboxylic acid salts.

Polyphosphates are, of course, well known as valuable constituents of modern soap and synthetic detergent formulations. In the washing process, phosphates not only sequester all the hardness but also help disperse the soil. In recent years, however, phosphates appearing in waste effluents have been considered detriments to the ecosystem. Hence, the replacement, partial or complete, of phosphates by other materials and/or procedures is an objective of detergent manufacturers. Water-soluble organic complexing agents such as amino carboxylic acids have been used as phosphate substitutes, but so far do not meet all the requirements for large-scale replacement.

As an external measure, hardness in water supplies for industrial and domestic washing operations may be reduced by using regenerable organic resin ion-exchangers. An alternative method uses non-crystalline aluminosilicate exchangers which can also be regenerated. However, the regeneration operation for either type of exchanger requires investment in additional apparatus and timely maintenance thereof. Moreover, the use of a softened water supply does not solve the problem of alkaline earth ions brought into the washing operation by soil on the objects to be cleaned.

The use of water-insoluble inorganic ion-exchangers, which may be subsequently separated from, or discarded with, the effluent from the washing process is not new; bentonite-type clays have long been used in washing formulations, but do not satisfy present laundry requirements.

Because of their superior cation-exchange capability, three-dimensional crystalline zeolites have for some time been proposed as water-softening agents. An early proposal in this regard is set forth in U.S. Pat. No. 3,112,176 issued November 1963 to W. L. Haden, Jr. et al. More recent publications such as British Pat. No. 1,429,143, published Mar. 24, 1976 disclose the use in detergent compositions of water-insoluble zeolites as non-regenerated ion-exchangers such as zeolite A and zeolite X. Typically such publications equate suitability of the particular zeolite employed with its ability to sequester calcium cations. The aforesaid British patent specifically discloses that crystalline zeolites in general show a marked selectivity for calcium ions in aqueous media. Other polyvalent hardness ions such as magnesium and iron are sequestered by auxiliary "builders" which are in general water soluble inorganic or organic salts such as carbonates, silicates, phosphates, carboxylates and sulfonates.

Our own studies have revealed that both sodium zeolite A, having a pore diameter of 4 Angstroms, and sodium zeolite X, having a pore diameter of about 8 Angstroms, do indeed exhibit a preference for the ion exchange of calcium cations from aqueous media relative to magnesium cations under the same conditions and at equilibrium. Also calcium cations are more rapidly exchanged for sodium cations in zeolite X than in zeolite A, and more rapidly than magnesium cations in the case of zeolite X. Magnesium cations, apparently because of their large size when hydrated, enter the pores of zeolite A very slowly, and do not readily displace calcium cations from zeolite X.

It has been surprisingly found, however, that a mixture of sodium zeolite A and sodium zeolite X containing from 40 to 70 weight percent of either species and a complementary amount of the other species lowers the total calcium and magnesium cation content of an aqueous solution to a substantially greater degree than an equivalent weight amount of either species and greatly decreases the residual magnesium content thereof beyond the reduction capable with zeolite A alone. As with all synergistic effects, the causes of the present phenomenon are not apparent.

The present discovery is illustrated by the following examples described in conjunction with the drawings.

In the drawings, the FIGURE is a graphical representation showing the percent of initial combined $Ca^{++}$ and $Mg^{++}$ cations remaining in aqueous solution after contact for various periods with various mixtures of sodium zeolite A and sodium zeolite X.

EXAMPLE 1

A typical hard water composition was synthesized by first preparing a stock solution equivalent to a hardness value of 700 grains/gal. Accordingly, 11.802 grams of $CaCl_2.6\ H_2O$ and 8.160 grams of $MgCl_2.6\ H_2O$ were put into a one-liter volumetric flask; distilled water was added to make one liter of solution. By using a dilution factor of 100, a "standard" hard water composition of 7.0 grains/gal. was obtained equivalent to a concentration of 1.7 milliequivalents (meq.) $Ca^{++}$ and 0.8 meq. $Mg^{++}$ per liter of solution, i.e. the total hardness ($Ca^{++} + Mg^{++}$) was 2.5 meq./liter. A quantity of the particular zeolite X and zeolite A mixture, equivalent to 0.6 gm./liter, was combined with 25 ml. of distilled water and pre-dispersed in an ultrasonic bath unit for 2.5 hours. To a volumetric flask containing 965 ml. of deionized water was added by pipette 10 ml. of the above-described "hard water" stock solution composition (700 grains/gal.). This solution was placed in a 2-liter plastic tank fitted with baffles. Mixing was done with a turbine mixer having a four-blade flat impeller, at approximately 690 rpm. At the beginning of the contact period ($t = 0$ seconds) 25 ml. of the zeolite slurry was quickly added to the hard water solution. At the end of the specified contact time a sample of the treated solution was extracted by a micro-syringe equipped with a filter unit to separate the zeolite particles from the sample. Thus at the several contact times the analyses of the corresponding extracted samples show the depletion of the $Ca^{++}$ and the $Mg^{++}$ cations by the zeolite mixture. The analyses for $Ca^{++}$ and $Mg^{++}$ were carried out by standard atomic absorption techniques. In this manner, the data represented by the curves of the FIGURE of the drawings were obtained.

EXAMPLE 2

To a 25 ml. container was added 0.399 grams of sodium zeolite X and 0.381 grams of sodium zeolite A and the resultant mixture slurried in an ultrasonic bath unit for 2 hours. One liter of "standard" hard water solution containing 7.0 grains/gal of combined $Mg^{++}$ and $Ca^{++}$ ions prepared as in Example 1 and placed in a 2-liter plastic tank fitted with baffles. At the beginning of the contact period ($t = 0$ seconds) 25 ml. of the zeolite slurry was quickly added to the standard hard water solution and mixed with a turbine mixer having a four-blade flat impeller at approximately 690 rpm. At the end of the specified contact time a sample of the treated solution was extracted by a micro-syringe equipped with a filter unit to separate the zeolite particles from the sample. The $Mg^{++}$, $Ca^{++}$ and $Na^+$ cation content of the sample for each contact period are set forth in the table below:

| Sample No. | Contact Time, Sec. | Ion | Ion Conc., ppm (wt.) | Ion Conc., Meq./liter |
|---|---|---|---|---|
| 1 | 0 | $Mg^{++}$ | 9.98 | 0.821 |
|   |   | $Na^+$ | 0.95 | 0.041 |
|   |   | $Ca^{++}$ | 34.34 | 1.714 |
| 2 | 36 | $Mg^{++}$ | 4.62 | 0.380 |
|   |   | $Na^+$ | 48.83 | 2.124 |
|   |   | $Ca^{++}$ | 2.77 | 0.138 |
| 3 | 66 | $Mg^{++}$ | 3.89 | 0.320 |
|   |   | $Na^+$ | 51.03 | 2.220 |
|   |   | $Ca^{++}$ | 1.89 | 0.094 |
| 4 | 207 | $Mg^{++}$ | 2.84 | 0.234 |
|   |   | $Na^+$ | 53.54 | 2.329 |
|   |   | $Ca^{++}$ | 1.58 | 0.079 |
| 5 | 627 | $Mg^{++}$ | 1.89 | 0.155 |
|   |   | $Na^+$ | 56.07 | 2.439 |
|   |   | $Ca^{++}$ | 0.63 | 0.031 |

The zeolite mixture of the present invention is most advantageously used to treat aqueous media having pH values of from about 7 to about 10 and containing calcium and magnesium ions each in a concentration of 0.5 to 5 meq./liter, at temperatures of from 40° to 200° F., preferably 50° to 125° F.

In detergent compositions which utilize the synergistic effect of the zeolite mixture of this invention, no changes in the formulations need be made, except, of course, to reduce the relative proportion of crystalline zeolite to take advantage of the improved efficacy of the mixed zeolite constituents. Such compositions can comprise from 5 to 95 percent by weight of the sodium zeolite A-sodium zeolite X mixture, the zeolite particles preferably having average diameters of from 0.1 to 100 micro-meters, and from 95 to 5 percent by weight of at least one or a mixture of two or more of a water-soluble anionic, nonionic, ampholytic or zwitterionic organic surface-active agent. A typical listing of the classes and species of detergent compounds useful in the present compositions is set forth in U.S. Pat. No. 3,664,961, which in its entirety is incorporated by reference herein. These surface active agents include soaps, i.e. the water-soluble salts of the higher fatty acids, preferably those containing 10 to 20 carbon atoms; the water soluble salts of organic sulfuric reaction products having in their molecular structure an alkyl group containing from 8 to 22 carbon atoms and a sulfonic acid or sulfuric acid ester group; the anionic detergents such as the sodium alkyl glyceryl ether sulfonates and the sodium coconut oil fatty acid monogly ceride sulfonates and sulfates; the water-soluble nonionic of the kind produced by the condensation of alkylene oxide groups with an organic hydrophobic aliphatic or alkyl aromatic compound; the ampholytic derivatives of aliphatic or heterocyclic secondary and tertiary amines in which the aliphatic moiety can be straight or branched chain, at least one of which contains from 8 to 18 carbon atoms; and zwitterionic detergents which include derivatives of aliphatic quaternary ammonium, phosphonium and sulfonium compounds in which the aliphatic moiety can be straight or branched chain and at least one of which contains from 8 to 18 carbon atoms. The detergent compositions can also contain auxiliary water soluble builders, enzymes, thickeners, perfumes, optical bleaches, abrasive agents, fillers, fabric softeners and any and all of the additional materials commonly found in laundering and cleaning compositions.

It will be understood that the rate of the ion exchange reactions on which the present invention is based, are dependent on such factors as the temperature of the aqueous media, the initial concentration of the calcium and magnesium cation in the aqueous media and the like. In general, however, beneficial results are obtained after the zeolite A-zeolite X mixture has contacted the aqueous medium for at least 30 seconds. Preferably a contact time of 2 minutes or more is allowed.

What is claimed is:

1. Process for sequestering calcium and magnesium cations from aqueous solutions thereof which comprises contacting at a temperature of from 40° to 200° F. said aqueous solution having a pH of from 7 to 10 and containing from 0.0005 to 0.005 gram ions of calcium per liter and from 0.000125 to 0.005 gram ions of magnesium per liter with a mixture of sodium zeolite A and sodium zeolite X, said mixture containing from 40 to 70 weight percent of one of the said zeolite species and a complementary amount of the other.

2. Process according to claim 1 wherein the zeolite mixture contains from 40 to 70 weight percent of zeolite A.

3. Process according to claim 2 wherein the temperature of the aqueous solution containing the calcium and magnesium cations is 50° to 125° F.

* * * * *